US006744760B1

(12) United States Patent
Solheim (10) Patent No.: US 6,744,760 B1
(45) Date of Patent: Jun. 1, 2004

(54) NODE CONFIGURATIONS WITHIN COMMUNICATION SYSTEMS

(75) Inventor: Alan G. Solheim, Kanata (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/358,932

(22) Filed: Jul. 23, 1999

(51) Int. Cl.[7] .............................................. H04L 12/50
(52) U.S. Cl. ...................... 370/366; 370/369; 370/535
(58) Field of Search ................................. 359/180, 121, 359/128, 124, 168; 398/59, 123, 45, 48; 370/401, 409, 410, 389, 295, 375, 380, 369, 386, 419, 430, 463, 535, 442, 366; 701/13; 361/796, 725; 307/140

(56) References Cited

U.S. PATENT DOCUMENTS 5,303,078 A * 4/1994 Brackett et al. ............ 359/139
6,256,306 B1 * 7/2001 Bellenger ................... 370/389
6,298,289 B1 * 10/2001 Lloyd et al. .................. 701/13
6,535,313 B1 * 3/2003 Fatehi et al. ................ 359/139
6,539,027 B1 * 3/2003 Cambron .................... 370/442

* cited by examiner

Primary Examiner—John Pezzlo (57) ABSTRACT

A communication node to be implemented within an optical fiber communication system is described that consists of a number of individual cards inserted within a node shelf. Each card is a transponder that comprises a Short-Range (SR) transceiver, a Dense Wavelength Division Multiplexed (DWDM) transceiver, and a local switch coupled to both transceivers. The local switches of the cards are coupled together and each selectively couple the transceivers within their respective cards to the local switches of other cards so that the transceivers can be further coupled to transceivers of other cards. This allows failure and congestion protection systems to be implemented within the node while not requiring the use of a central cross-connect switch.

11 Claims, 8 Drawing Sheets

NODE CONFIGURATIONS WITHIN COMMUNICATION SYSTEMS

FIELD OF THE INVENTION

This invention relates generally to node configurations within a communication system such as an optical fiber communication system.

BACKGROUND OF THE INVENTION

The utilization and complexity of optical fiber communication systems is increasing dramatically. Within a single node of an optical fiber communication system, numerous components can be interconnected to allow for communication with numerous different short-range service platforms and remote locations. These node configurations typically allow for protection channels and/or extra traffic channels to be established by interconnecting duplicate components within the node which can be used during failure/extra traffic periods.

To dynamically coordinate changing interconnectivity between these numerous components, some current implementations utilize central cross-connect switches that are electrically configurable. These central cross-connect switches can establish data communications between two locations and with adjustments to their configurations, disconnect data communications or redirect data communications away from problem areas caused by failure or congestion.

A well-known implementation of a node within an optical fiber communication system that utilizes a central cross-connect switch is now described with reference to FIG. 1. The node depicted in FIG. 1 comprises a central cross-connect switch 102; first, second, third, and fourth Short-Range (SR) optical fiber transceivers 104,106,108,110 which are independently coupled to the central cross-connect switch 102; and first, second, third, and fourth Dense Wavelength Division Muliplexed (DWDM) transceivers 112,114,116,118 which are also independently coupled to the central cross-connect switch 102. It is noted that a transceiver comprises both transmitter and receiver portions which in some implementations would be physically different components. It is further noted that a SR optical fiber transceiver, hereinafter referred to as an SR transceiver, comprises a transceiver that is coupled to a service platform, typically a computing device, that is local to the node.

In this illustrated implementation, the first and second SR transceivers 104,106 are further coupled to a first service platform (not shown) via a first SR working channel 120 and a first SR protection/extra traffic (Prot./E.T.) channel 122 respectively; the third and fourth SR transceivers 108,110 are further coupled to a second service platform (not shown) via a second SR working channel 124 and a second SR protection/extra traffic (Prot./E.T.) channel 126 respectively; the first and second DWDM transceivers 112,114 are further coupled to a first remote location (not shown) via a first DWDM working channel 128 and a first DWDM protection/extra traffic (Prot./E.T.) channel 130 respectively; and the third and fourth DWDM transceivers 116,118 are further coupled to a second remote location (not shown) via a second DWDM working channel 132 and a second DWDM protection/extra traffic (Prot./E.T.) channel 134 respectively.

Figure 1:
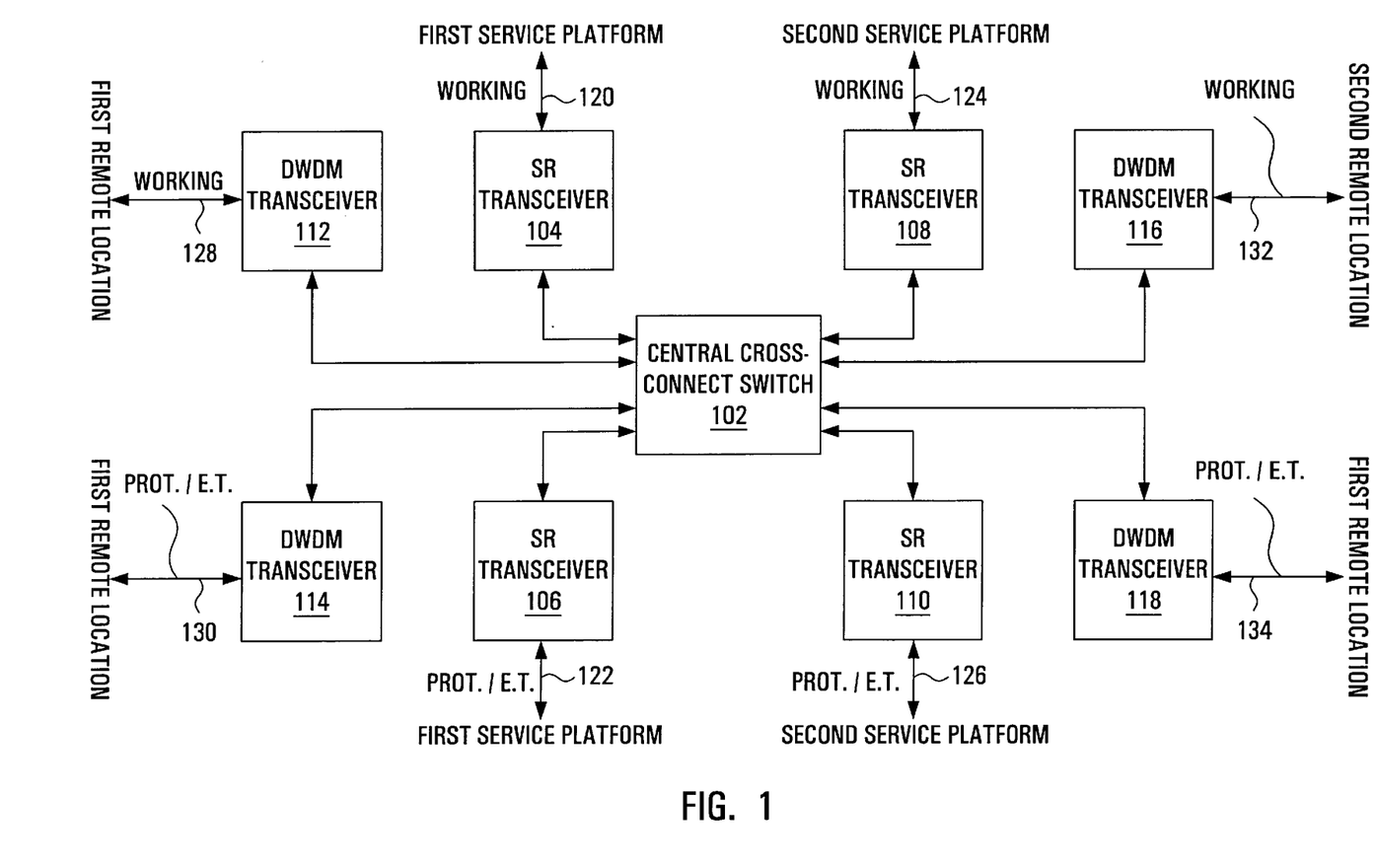
FIG. 1 is a block diagram of an optical fiber communication system utilizing a well known central cross-connect switch.

The central cross-connect switch 102 operates to interconnect the transceivers depicted in FIG. 1 so that data information input to a receiver portion of one of the transceivers can be forwarded to a transmitter portion within another of the transceivers for transmission to the desired location. In the configuration shown in FIG. 1, a 1:1 protection scheme is illustrated that indicates that for every working channel there is an identical protection/extra traffic channel. In normal circumstances, the data communications would be forwarded to the proper location through the appropriate working channel, but in case of failure and/or congestion in the working channel, the data communications would be forwarded through the corresponding protection/extra traffic channel.

There are a number of disadvantages to the node configuration as illustrated in FIG. 1. For one, in order to have proper operation of the node and to coordinate the interconnectivity between individual components of the node, the central cross-connect switch 102 is required. This is an additional component that must be produced, maintained, and inserted within the shelf in which the node is installed. Further, when utilizing the central cross-connect switch 102 of FIG. 1, each transceiver that is added to the node must have two backplane connections to the central cross-connect switch 102, one for the transmitter portion and one for the receiver portion. Since both shelf space and backplane connection space are critical limitations on a node, a design that could reduce the required shelf space and backplane connection space would be advantageous.

SUMMARY OF THE INVENTION

The present invention utilizes a series of local switches that are distributed throughout a communication node rather than a central cross-connect switch. Preferably, the node consists of a number of cards within a node shelf that each have a local switch and one or more communication devices such as transceivers, multiplexers, demultiplexers, transmitters or receivers. Each of the local switches are preferably connected to all the other local switches so that the communication devices can be interconnected in a series of different configurations by controlling the local switches.

The present invention, according to a first broad aspect, is an apparatus, such as a circuit card, that is arranged to be implemented within a communication node. The apparatus includes one or more communication devices that are operable to transmit data information to and/or receive data information from a device external from the node. Further, the apparatus includes a local switch coupled to the communication device that can selectively couple the communication device and another local switch within another apparatus of the communication node.

The present invention, according to a second broad aspect, is a communication node arranged to be implemented within a communication system. The communication node includes a plurality of apparatuses. Each apparatus includes one or more communication devices that are operable to transmit data information to and/or receive data information from a device external from the node. Further, each apparatus includes a local switch coupled to the communication device. The local switches within the apparatuses are coupled together and each of the local switches is operable to selectively couple its respective communication device and one or more of the other local switches.

Other aspects and features of the present invention will become apparent to those ordinarily skilled in the art upon review of the following description of specific embodiments of the invention in conjunction with the accompanying FIGURES.

BRIEF DESCRIPTION OF THE DRAWINGS

Preferred embodiments of the present invention are described with reference to the following figures, in which.

DETAILED DESCRIPTION OF THE PREFERRED EMBODIMENTS

Embodiments of the present invention remove the need to have a central cross-connect switch such as illustrated in FIG. 1 while maintaining the necessary functionality that the central cross-connect switch provided. In preferred embodiments of the present invention, a plurality of local switches are distributed amongst the individual components within a node that together perform a virtually identical operation to the central cross-connect switch 102 of FIG. 1.

A node is typically implemented with a series of interface cards that can be inserted within a node shelf. The interface cards may contain one or more components that would, in previous implementations, each be interconnected with the central cross-connect switch. In one embodiment, the SR and DWDM transceivers of FIG. 1 are divided up into cards such that one SR transceiver and one DWDM transceiver are on each card. Such a card is hereinafter referred to as a transponder.

Figure 2:
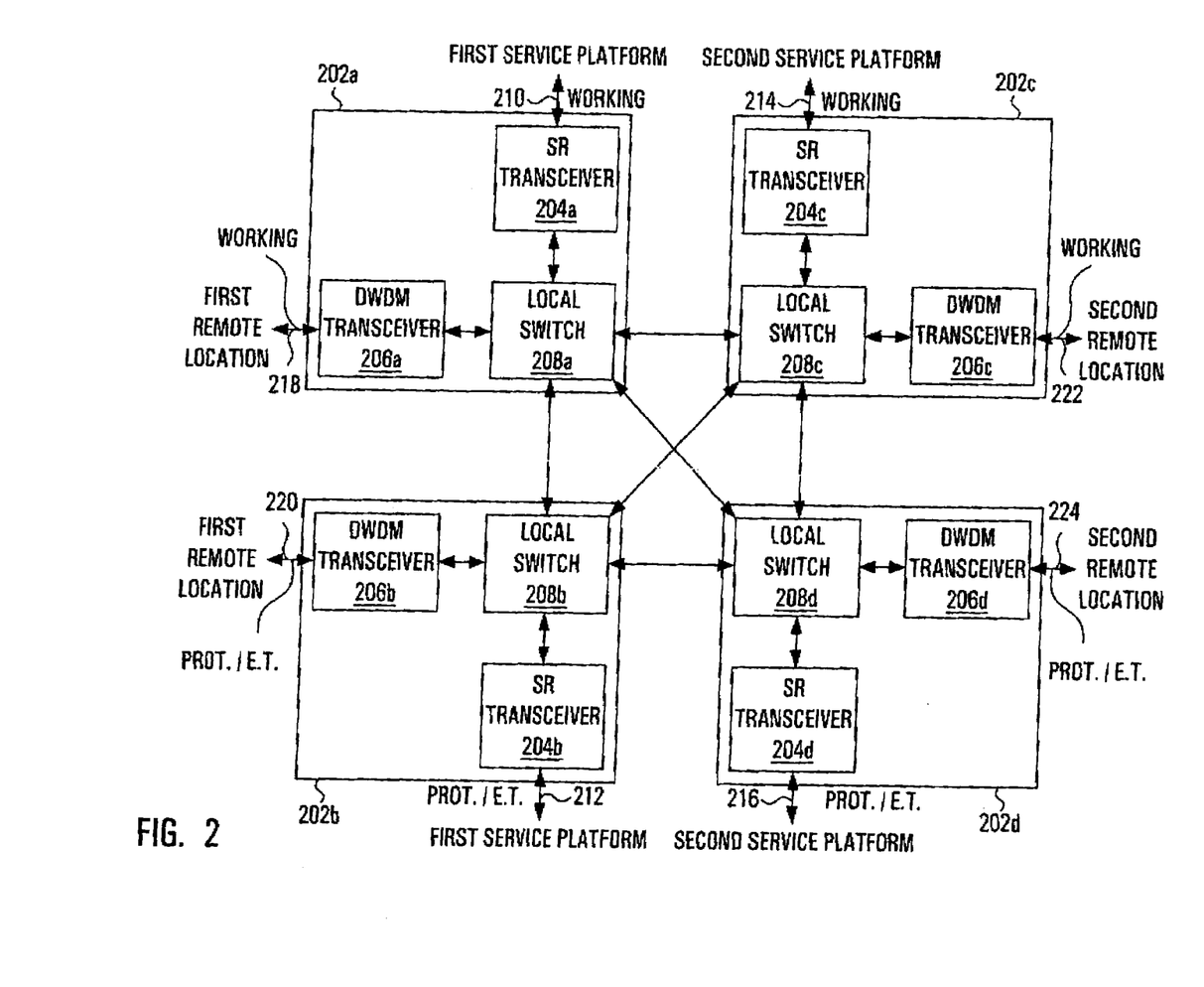
FIG. 2 is a block diagram of an optical fiber communication system utilizing a plurality of local switches according to a preferred embodiment of the present invention.

FIG. 2 illustrates a node configuration according to a preferred embodiment of the present invention that comprises first, second, third, and fourth transponders 202a, 202b,202c,202d. Although, as described below, this preferred embodiment comprises four transponders, it should be recognized that it could include more or less transponders with only minor modifications being required. Each of these transponders 202a,202b,202c,202d respectively comprise a SR transceiver 204a,204b,204c,204d, a DWDM transceiver 206a,206b,206c,206d, and a local switch 208s,208b,208c, 208d that will be described in detail herein below with reference to FIG. 3. As depicted in FIG. 2, each of the SR transceivers 204a,204b,204c,204d are coupled to the corresponding local switch 208a,208b,208c,208d and to either a first or second service platform (not shown); each of the DWDM transceivers 206a,206b,206c,206d are coupled to the corresponding local switch 208a,208b,208c,208d and to either a first or second remote location (not shown); and each of the local switches 208a,208b,208c,208d are preferably further coupled to each of the other local switches within the node.

As illustrated in FIG. 2, two of the SR transceivers 204a,204b are coupled to the first service platform (not shown) via a first SR working channel 210 and a first SR protection/extra traffic (Prot./E.T.) channel 212 respectively. Two of the SR transceivers 204c,204d are coupled to the second service platform (not shown) via a second SR working channel 214 and a second SR protection/extra traffic (Prot./E.T.) channel 216 respectively. Two of the DWDM transceivers 206a,206b are coupled to the first remote location (not shown) via a first DWDM working channel 218 and a first DWDM protection/extra traffic (Prot./E.T.) channel 220 respectively. And, two of the DWDM transceivers 206c,206d are coupled to the second remote location (not shown) via a second DWDM working channel 222 and a second DWDM protection/extra traffic (Prot./E.T.) channel 224 respectively. In this configuration, the four local switches 208a,208b,208c,208d together operate essentially the same as the central cross-connect switch 102 within FIG. 1. Similar to FIG. 1, the node configuration is setup in a 1:1 protection scheme that allows for communications to be established via the node, to be disconnected, and to be redirected away from congestion or failure areas.

A preferred embodiment of the local switch 208a as implemented within the transponder 202a is now described in detail with reference to FIG. 3. It should be understood that in exemplary versions of the node of FIG. 2, each of the local switches 208a,208b,208c,208d would be similar to that described below for local switch 208a.

In this preferred embodiment, the local switch 208a comprises SR and DWDM duplicators 302,304 that are coupled to the corresponding receiver portion of the SR transceiver 204a and receiver portion of the DWDM transceiver 206a respectively; and SR and DWDM selectors 306,308 that are coupled to the corresponding transmitter portion of the SR transceiver 204a and transmitter portion of the DWDM transceiver 206a respectively. Preferably, the SR duplicator 302 is coupled to the DWDM selector 308 via line 310 and the DWDM duplicator 304 is coupled to the SR duplicator 306 via line 312. Further, the local switch 208a comprises a series of selectors 314 that are each coupled to both of the duplicators 302,304 via lines 316; and a series of duplicators 318 that are each coupled to both of the selectors 306,308 via lines 320.

Figure 3:
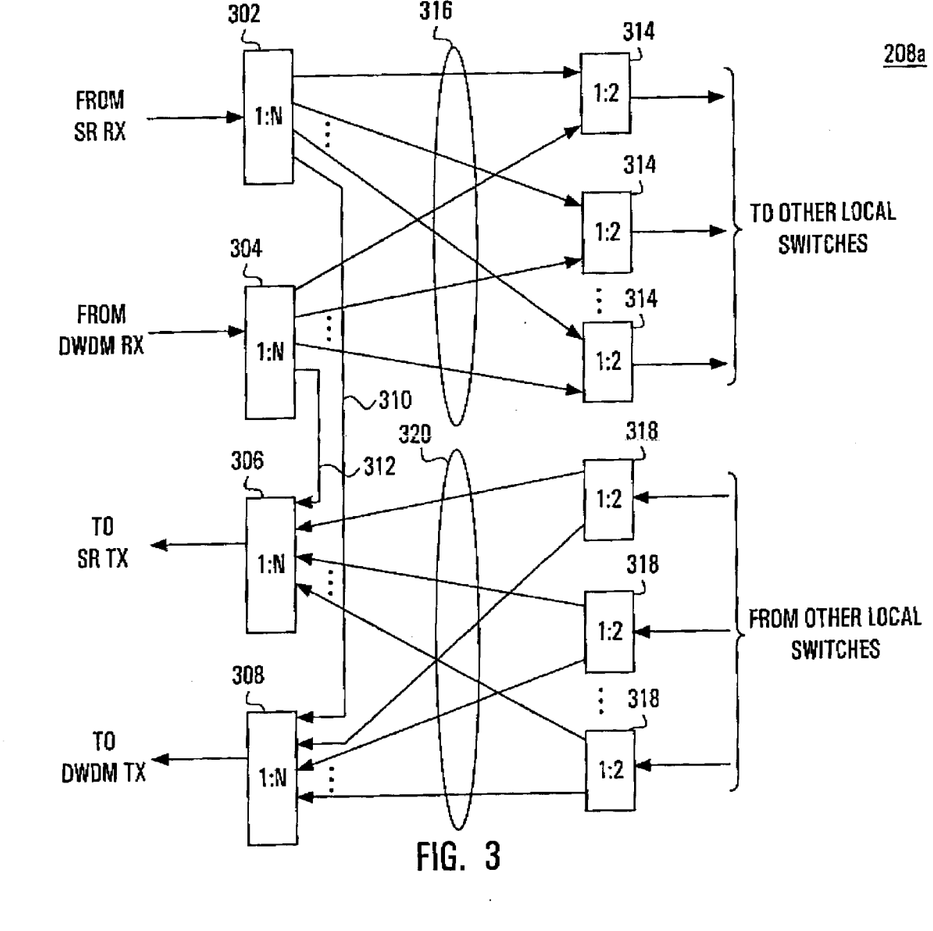
FIG. 3 is a detailed block diagram of a local switch as implemented in FIG. 2 according to an exemplary embodiment.

As depicted in FIG. 3, the duplicators 302,304,318 are devices that receive a signal and duplicate it numerous times, outputting a plurality of signals identical to the signal that is received. The selectors 306,308,314 are devices that receive one or more signals and select which signal to be output, if any, preferably by opening or closing a number of switches controlled by software flags triggered by a control apparatus (not shown).

When the transponder 202a is implemented within the node of FIG. 2, one of the selectors 314 and one of the duplicators 318 within the local switch 208a are coupled to each of the other local switches 208b,208c,208d within the node. In some embodiments, there are identical numbers of selectors/duplicators 314,318 as there are local switches within the node, though this is not the only possibility. In some embodiments, in order to allow it to be scalable, there are large numbers of selectors 314 and duplicators 318 (eg. seven or fifteen) so that the local switch does not have to be replaced if the transponder it is implemented within becomes a part of a node with an increased number of other transponders. In these embodiments, the unused selectors 314 and duplicators 318 are preferably disabled.

The basic operation of the local switch 208a when implemented within the transponder 202a of FIG. 2 is now described. Data signals from the receiver portion of the SR transceiver 204a received at the SR duplicator 302 are replicated and output to the DWDM selector 308 via the line 310 and each of the selectors 314 via the lines 316, while data signals from the receiver portion of the DWDM transceiver 206a received at the DWDM duplicator 304 are replicated and output to the SR selector 306 via the line 312 and each of the selectors 314 via the lines 316. Further, any data signals from the other local switches within the node received at the duplicators 318 are replicated and output to the SR and DWDM selectors 306,308 via the lines 320.

In normal operations, each of the selectors 306,308,314 are controlled through the use of software flags to select for forwarding one or none of the data signals that are received. Hence, the SR selector 306, the DWDM selector 308 and the selectors 314 each allow at most one signal to be forwarded to the transmission portion of the SR transceiver 204a, the transmission portion of the DWDM transceiver 206a, and the other local switches in the node respectively.

It can be seen that the local switch 208a, when implemented in a node as depicted in FIG. 2, would allow flexibility in implementing failure and extra traffic protection. For example, numerous options are available if a failure occurs when attempting to transmit data traffic from the first service platform (not shown) to the first remote location (not shown). In normal operations, the data traffic would be received at the receiver portion of the SR transceiver 204a from the first service platform (not shown), forwarded to the SR duplicator 302, duplicated and output to the DWDM selector 308, selected to be forwarded to the transmitter portion of the DWDM transceiver 206a, and output to the first remote location (not shown).

If the failure occurred in the DWDM transceiver 206a, with the use of software flags triggered by the control apparatus (not shown), the data traffic from the SR duplicator 302 can be deselected at the DWDM selector 308 and selected at the selector 314 that is coupled to the local switch 208b, that being the local switch that is also coupled to the first remote location (not shown) via the DWDM transceiver 206b and the protection/extra traffic channel 220. Within the local switch 208b that is similar to the local switch 208a depicted within FIG. 3, the data traffic can be received at the duplicator 318 coupled to the local switch 208a, replicated and output to the DWDM selector 308, selected for forwarding to the transmitter portion of the DWDM transceiver 206b, and output to the first remote location (not shown). Alternatively, the data traffic could be redirected through the SR transceiver 204b, the local switch 208b, and the DWDM transceiver 206b. Further possible alternatives are possible including utilizing alternative routes to the first remote location (not shown) through the second remote location (not shown).

If the failure occurred in the SR transceiver 204a, it can be seen that a similar redirecting of the data traffic could be made with the partial use of the second transponder 202b by routing traffic through SR transceiver 204b, the local switch 208b, the local switch 208a, and the DWDM transceiver 206a; or with the complete use of the second transponder 202b by routing traffic through SR transceiver 204b, the local switch 208b, and the DWDM transceiver 206b.

Numerous other failure or congestion problems could occur within the node of FIG. 2. In these cases, the local switches 208a,208b,208c,208d operating together under the control of the control apparatus (not shown), in many circumstances, would be capable of maintaining proper communications despite the problem.

Although the preferred embodiments of the present invention utilize local switches as depicted in FIG. 3, this is not meant to limit the scope of the present invention. In fact, the present invention can be implemented with any distributed switches that allow for flexible configuring of the components within the node. For instance, the electrically switched devices depicted within FIG. 3 for the preferred embodiment of the present invention could be replaced with optically switched devices. Further, although the local switch 208a depicted in FIG. 3 does not have the capability to loop back data traffic received from the receiver portion of the SR or DWDM transceiver to the transmitter portion of the same SR or DWDM transceiver, this capability can be easily added by coupling the SR duplicator 302 to the SR selector 306 and by coupling the DWDM duplicator 304 to the DWDM selector 308. Yet further, the simultaneous connection of both the SR and DWDM transceivers 204a,206a to one of the other transponders in the node is not possible (since it is typically not necessary), but could be possible if additional devices are added.

The node configuration that has been described with reference to FIGS. 2 and 3 is a specific example for interconnecting transponders. It should be realized that the present invention can be implemented in many different situations where current implementations use a central cross-connect switch to connect a plurality of individual components.

One such implementation possibility for the node configuration of the preferred embodiment shown in FIG. 2 is within a Bi-directional Line Switched Ring (BLSR). For this implementation, the node of FIG. 2 is configured such that the first and second remote locations correspond to two nodes within the BLSR that are in opposite directions (east and west)in the ring from it. Hence, the first and second service platforms, coupled to the node of FIG. 2, would be capable of transmitting and/or receiving data signals to/from either direction of the BLSR.

Figure 4:
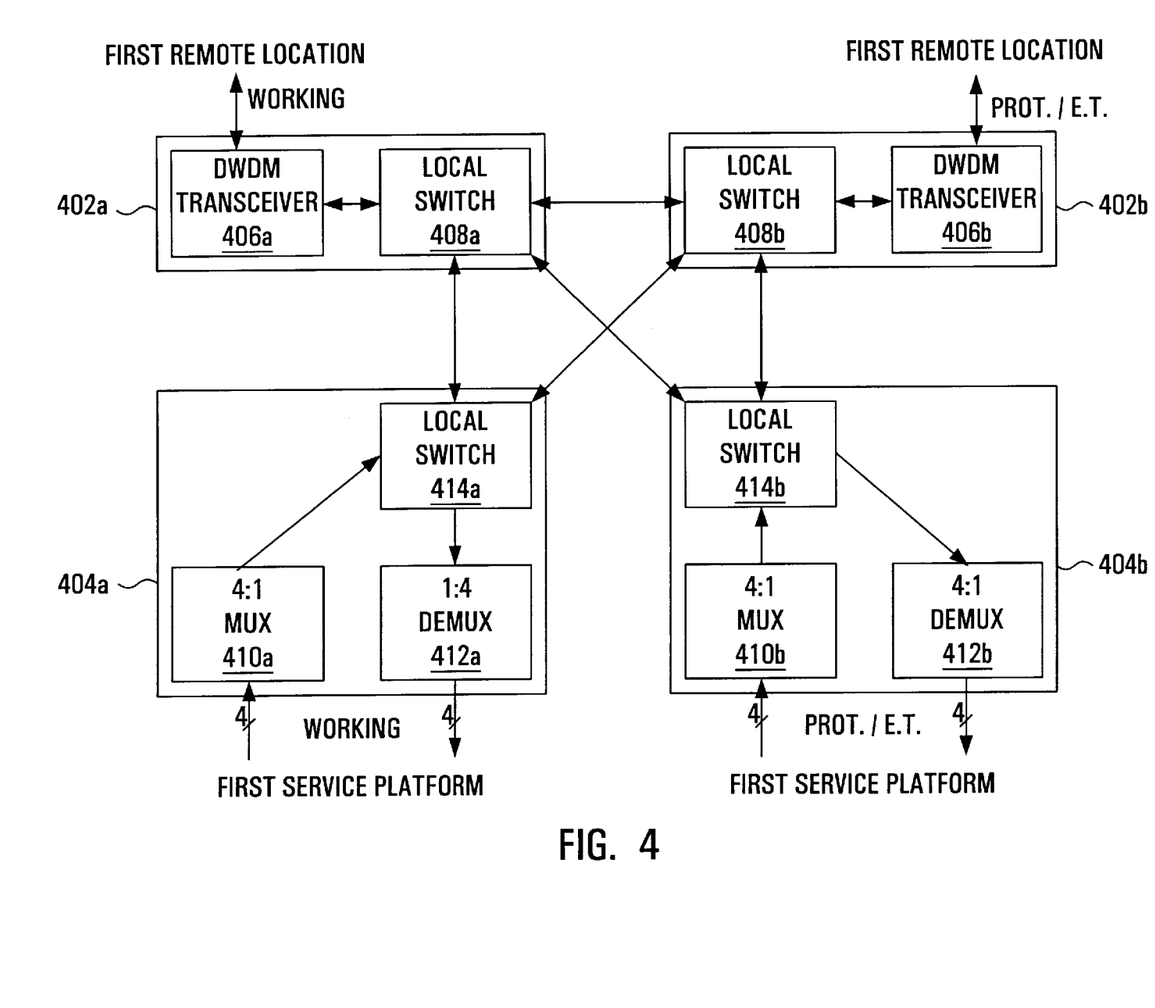
FIG. 4 is a block diagram of a Time Division Multiplexed (TDM) optical fiber communication system utilizing a plurality of local switches according to a preferred embodiment of the present invention.

FIG. 4 depicts one alternative implementation that utilizes distributed local switches similar to local switch 208a depicted in detail in FIG. 3. The key difference between the implementations of the present invention depicted in FIGS. 2 and 4 is the use of different components within each card. This difference does not change the advantages of the present invention, but simply illustrates that the present invention is not limited to the cards of FIG. 2.

The node illustrated in FIG. 4 comprises first, second, third, and fourth cards 402a,402b,404a,404b. The first and second cards 402a,402b are similar to the transponders 202a,202b,202c,202d as depicted in FIG. 2 with the SR transceivers removed. Hence, the first and second cards 402a,402b preferably comprise respective DWDM transceivers 406a,406b and local switches 408a,408b that are coupled together. Alternatively, cards 402a,402b could be identical to the transponders of FIG. 2, but with the SR transceivers simply disabled. The third and fourth cards 404a,404b comprise respective 4:1 Time Division Multiplexed (TDM) multiplexers (MUX) 410a,410b, 1:4 TDM demultiplexers (DEMUX) 412a,412b, and local switches 414a,414b coupled to both the corresponding multiplexers 410a,410b and demultiplexers 412a,412b.

As depicted in FIG. 4, the interconnectivity of the cards 402a,402b,404a,404b is done with use of the local switches 408a,408b,414a,414b. Both the local switches 414a,414b within respective cards 404a,404b are independently coupled to the local switches 408a,408b. The local switches 408a,408b are further coupled together. This node configuration allows the DWDM transceiver 406b to be utilized as a protection device for the DWDM transceiver 406a and allows the multiplexer 410b and demultiplexer 412b to be used in case of congestion of the multiplexer 410a and demultiplexer 412a.

The local switches 408a,408b,414a,414b in this embodiment are preferably similar to the local switch 208a depicted in FIG. 3 with slight modifications. Specifically, the local switches 408a,408b preferably are the same as the local switch 208a with the SR duplicator 302, the SR selector 306, and all but three of the selectors 314 and duplicators 318 disabled or removed. On the other hand, the local switches 414a,414b preferably are the same as the local switch 208a with the SR duplicator 302 and SR selector 306 being coupled to the respective 4:1 TDM multiplexer 410a,410b rather than the SR transceiver 204a; the DWDM duplicator 304 and the DWDM selector 308 being coupled to the respective 1:4 TDM demultiplexer 412a,412b rather than the DWDM transceiver 206a; and all but two of the selectors 314 and duplicators 318 disabled or removed.

Figure 5A:
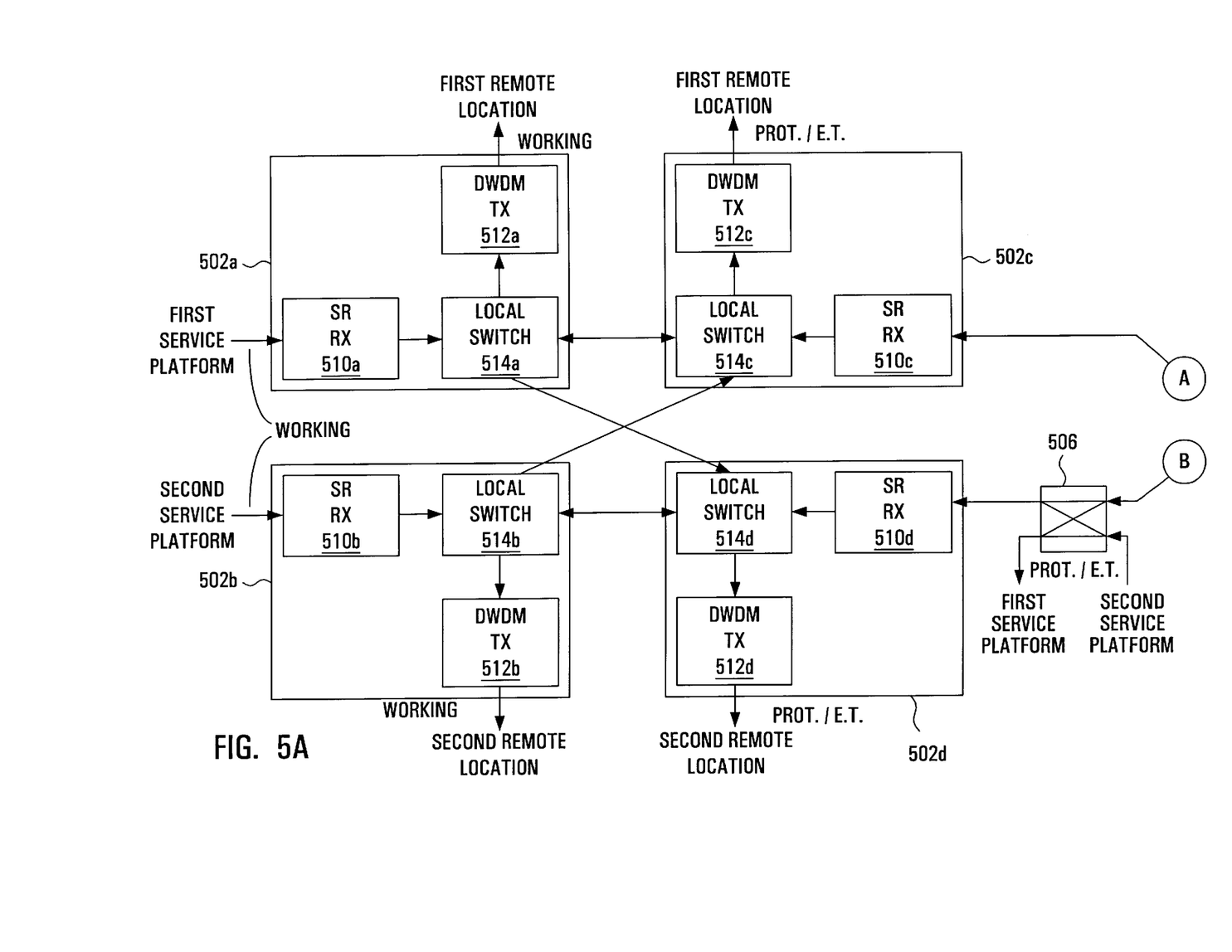
FIGS. 5A and 5B are block diagrams of alternative optical fiber communication systems of FIG. 2 that allow for the on-ramp and off-ramp functionality to be implemented on separate cards.
Figure 5B:
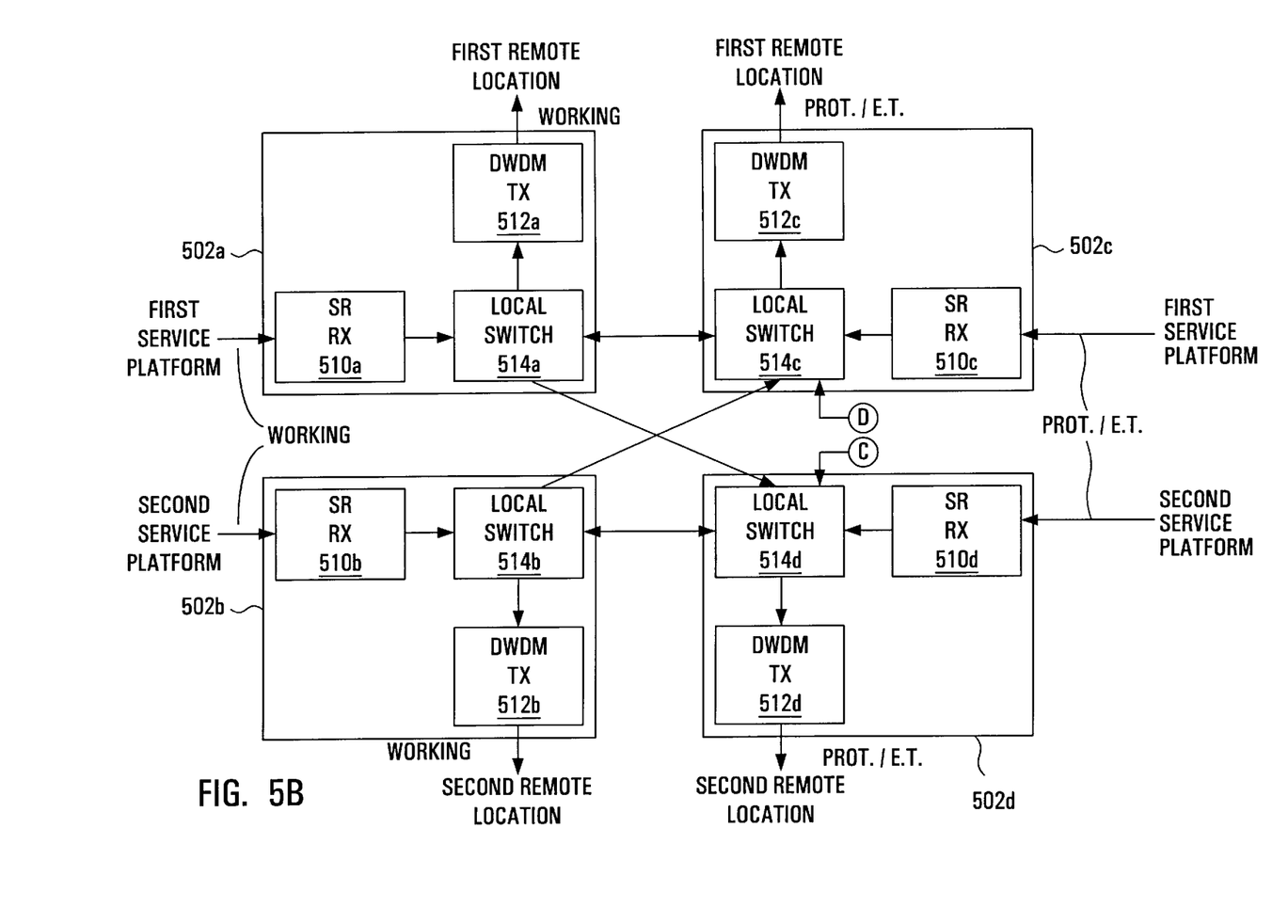

FIGS. 5A and 5B illustrate nodes according to further embodiments of the present invention with the on-ramp and off-ramp functionality implemented on separate cards. The on-ramp functionality includes receiving data signals from a local service platform and transmitting them to a remote location. Conversely, the off-ramp functionality includes receiving data signals from a remote location and forwarding them to a local service platform. The nodes depicted in FIGS. 5A and 5B are two possible implementations of such a node with separated on-ramp and off-ramp functionality. The node depicted within FIG. 5A comprises first, second, third, and fourth on-ramp cards 502a,502b,502c,502d, first, second, third, and fourth off-ramp cards 504a,504b,504c, 504d, and first and second 2×2 optical switches 506,508. The node of FIG. 5B has similar on-ramp and off-ramp cards, but does not utilize the optical switches 506,508; instead, it maintains identical functionality through the use of additional electrical connections as will be described herein below.

Each of the on-ramp cards 502a,502b,502c,502d respectively comprise a SR receiver 510a,510b,510c,510d, a DWDM transmitter 512a,512b,512c,512d, and a local switch 514a,514b,514c,514d similar to the local switch 208a depicted within FIG. 3. On the other hand, each of the off-ramp cards 504a,504b,504c,504d respectively comprise a SR transmitter 516a,516b,516c,516d, a DWDM receiver 518a,518b,518c,518d, and a local switch 520a,520b,520c, 520d. As depicted in FIGS. 5A and 5B, the components within each on-ramp and off-ramp card are configured similar to that described previously for the transponders of FIG. 2. The key difference is that the transmitters and receivers of FIGS. 5A and 5B are only one directional (transmit or receive) while the transceivers of FIG. 2 are bi-directional (transmit and receive).

The configurations of the on-ramp and off-ramp cards as depicted in FIGS. 5A and 5B are designed to minimize the number of backplane connections at the same time as maintaining the minimum required protection functionality for a BLSR as will be described herein below. The backplane connections of FIGS. 5A and 5B include bidirectional connections between local switches 514a and 514c, 514b and 514d, 520a and 520c, and 520b and 520d, as well as further connections from the local switches 514a,514b,520c,520d to the local switches 514d,514c,520b,520a respectively.

In the specific embodiments shown in FIGS. 5A and 5B, the DWDM transmitters 512a,512c and DWDM receivers 518a,518c are coupled to a first remote location (not shown) and the DWDM transmitters 512b,512d and DWDM receivers 518b,518d are coupled to a second remote location (not shown). Further, for both figures, the SR receivers 510a, 510b are coupled to and receive data from a first service platform (not shown) and a second service platform (not shown) respectively; while the SR transmitters 516a,516b are further coupled to and transmit data to the first service platform and the second service platform respectively. The key differences between the embodiments of the present invention depicted within FIGS. 5A and 5B are the connections that are used to connect the on-ramp and off-ramp functionality, those being optical versus electrical switching.

In FIG. 5A, the SR receivers 510c,510d are coupled to the SR transmitters 516d,516c respectively via the optical switches 508,506 respectively. For this embodiment, each of the optical switches 506,508 comprise 2 input ports and two output ports. The first optical switch 506 receives data at its input ports from the SR transmitter 516c and the second service platform and transmits data at its output ports to the SR receiver 510d and the first service platform. The second optical switch 508 receives data at its input ports from the SR transmitter 516d and the first service platform and transmits data at its output ports to the SR receiver 510c and the second service platform.

In contrast, within FIG. 5B, the connection between the on-ramp and off-ramp cards is done with electrical connections between the local switches 514c,514d and the local switches 520d,520c respectively. In this embodiment, the SR receivers 510c,510d are directly coupled to the first and second service platforms and the SR transmitters 516c,516d are directly coupled to the second and first service platforms respectively.

In the end, both embodiments with separated on-ramp and off-ramp functionality have identical overall capabilities with the only key difference being the use of optical versus electrical switching. One skilled in the art would understand that although optical switching is demonstrated for this embodiment only, similar use of optical switching instead of electrical switching could be made in other embodiments of the present invention.

By controlling the local switches 514a,514b,514c,514d within the on-ramp cards 502a,502b,502c,502d, the local switches 520a,520b,520c,520d within the off-ramp cards 504a,504b,504c,504d and, in the case of the embodiment depicted within FIG. 5A, the optical switches 506,508, 1:1 protection can be maintained for the node when implemented within a BLSR. In a BLSR with no failures, the first service platform communicates with the first remote location while the second service platform communicates with the second remote location. For the BLSR implementation, the first and second remote locations can be seen as adjacent devices in two opposite directions around the ring.

Protection capability of the node of FIG. 5A is now described in the case of problems occurring within the node and/or the BLSR comprising the node. Similar solutions can be seen for the node of FIG. 5B. The first example is for the case that the working channel between the first service platform and the SR receiver 510a fails during the transmission of data between the first service platform and the first remote location via the SR receiver 510a, the local switch 514a, and the DWDM transmitter 512a. In this situation, the data can be diverted away from the failure by directing the data traffic from the first service platform to the first remote location through the second optical switch 508, the SR receiver 510c, the local switch 514c, and either the DWDM transmitter 512c, or the local switch 514a and the DWDM transmitter 512a. The second example is for the case that a fiber is cut that comprises all of the connections from the node depicted within FIG. 5A and the first remote location during a similar transmission as described in the first example. In this situation, the data can be diverted away from the failure by transmitting the data via the SR receiver 510a, the local switch 514a, the local switch 514d, and the DWDM transmitter 512d to the second remote location. Then through the forwarding of the data through other nodes within the BLSR, the data can eventually be received at the first remote location. The connections between the on-ramp and off-ramp cards within the nodes of FIGS. 5A and 5B allow for the forwarding of data traffic from one remote location to another remote location when required. Although described for these particular examples, one skilled in the art would recognize that similar protection switching is possible during other failure or congestion problems concerning the nodes depicted within FIGS. 5A and 5B.

Although FIGS. 5A and 5B are designed for a BLSR implementation and a minimum number of backplane connections are used, this is not meant to limit the scope of the present invention. With the addition of more backplane connections between local switches, the embodiments depicted within FIGS. 5A and 5B can gain additional functionality. For instance, increased flexibility for communications to go from the first service platform to the second remote location can be gained with an additional backplane connection between the local switch 514a and the local switch 514b.

One key advantage of the present invention is the removal of the central cross-connect switch from the node configuration. The use of the central cross-connect switch has a financial cost due to the cost of the actual device and has a shelf space cost due to the slot that is reserved for the central switch. Preferably, with the removal of the central cross-connect switch, the financial cost of the node can be reduced, assuming the combined cost of the plurality of local switches is not significant, and the available shelf space can be increased. It is noted that, despite the removal of the central cross-connect switch, a node according to the preferred embodiment of the present invention would maintain independence between the tributary (SR) and line (DWDM) switching.

Another key advantage of the present invention is, in some circumstances, the reduced number of backplane connections that are required. One instance where this advantage can be seen is when comparing the node configurations depicted in FIGS. 1 and 2 which both comprise similar numbers and types of transceivers. The use of the central cross-connect switch requires two backplane connections for each transceiver that is to be connected within the node. Hence, with a total of eight transceivers, the total number of backplane connections is sixteen. For the embodiment of the present invention depicted within FIG. 2, there are two backplane connections connecting each transponder to each other transponder within the node. Hence, with four transponders, there are twelve backplane connections. It can be seen that in other situations where a low amount of transponders are utilized, the number of backplane connections can be decreased with the use of distributed local switches. This becomes even more advantageous if full functionality of the central cross-connect switch is not required. For instance, in FIG. 4, the third and fourth cards 404a,404b preferably do not have their local switches 414a, 414b coupled together, hence reducing the number of backplane connections further by two.

Further embodiments of the present invention are possible that have not been described herein above which configure the components within a node differently and/or utilize different components than those that have been described thus far. For example, rather than utilizing transceivers, components within a particular node could be receivers, transmitters, and/or other devices such as an Internet Protocol (IP) router. In general, it can be seen that the components can be any device that allows for communication, either in the short-range or long-range, with at least one other device; such a device is referred generally herein as a communication device.

Further, although all of the described embodiments depict node configurations that have four or eight cards inserted within a node shelf, it should be understood that this is not meant to limit the scope of the present invention. In general, the node configuration of the present invention must have at least two apparatuses; each apparatus, preferably being a card inserted within a node shelf, comprising a local switch and one or more communication devices.

Persons skilled in the art will appreciate that there are yet more alternative implementations and modifications possible, and that the above implementation is only an illustration of this embodiment of the invention. The scope of the invention, therefore, is only to be limited by the claims appended hereto.

What is claimed:

1. An apparatus arranged to be implemented within a communication node, the apparatus comprising:
   at least one communication device operable to transmit data information to or receive data information from a device external from the node; and
   at least one local switch coupled to the communication device and arranged to be coupled to at least one other local switch within another apparatus of the communication node, the local switch operable to selectively couple the communication device and the other local switch;
   wherein the at least one communication device comprises a plurality of communication devices, each of the communication devices being operable to at least one of transmit data information to and receive data information from devices external from the node;
   wherein at least one of the communication devices is a transmitter that is operable to transmit data information to one of the devices external from the node;
   wherein at least one of the communication devices is a receiver that is operable to receive data information from one of the devices external from the node; and
   wherein the receiver comprises a multiplexer that is operable to receive a first plurality of signals in parallel and output a first combined signal comprising the received signals; and the transmitter comprises a demultiplexer that is operable to receive a second combined signal comprising a second plurality of signals and output the second plurality of signals in parallel.

2. An apparatus arranged to be implemented within a communication node, the apparatus comprising:
   at least one communication device operable to transmit data information to or receive data information from a device external from the node; and
   at least one local switch coupled to the communication device and arranged to be coupled to at least one other local switch within another apparatus of the communication node, the local switch operable to selectively couple the communication device and the other local switch;
   wherein the at least one communication device comprises a plurality of communication devices, each of the communication devices being operable to at least one of transmit data information to and receive data information from devices external from the node, wherein the plurality of communication devices comprise a plurality of transceivers, each transceiver being operable to both transmit data information to and receive data intonation from one of the devices external from the node;

wherein the local switch comprises a plurality of transceiver duplicators, one corresponding to each of the transceivers, that receive and replicate signals output from the respective transceiver; at least one other local switch duplicator, corresponding to the other local switch, that receives and replicates signals output from the other local switch; a plurality of transceiver selectors, one corresponding to each of the transceivers, that receive one of the replicated signals from at least one of the transceiver duplicators and one of the replicated signals from the other local switch duplicator, and select which, if any, of the received signals to output to the respective transceiver; and at least one other local switch selector, corresponding lo the other local switch that receives one of the replicated signals from each of the transceiver duplicators and selects which, if any, of the received signals to output to the other local switch.

3. An apparatus arranged to be implemented within a communication node, the apparatus comprising:

at least one communication device operable to transmit data information to or receive data information from a device external from the node; and at least one local switch coupled to the communication device and arranged to be coupled to at least one other local switch within another apparatus of the communication node, the local switch operable to selectively couple the communication device and the other local switch;

wherein the at least one communication device comprises a plurality of communication devices, each of the communication devices being operable to at least one of transmit data information to and receive data information from devices external from the node;

wherein the local switch is arranged to be coupled to a plurality of other local switches within one or more other apparatuses, the plurality of other local switches corresponding to the at least one other local switch; and wherein the local switch operates to selectively couple each of the communication devices to each of the other local switches;

wherein the plurality of communication devices comprise a plurality of transceivers, each transceiver being operable to both transmit data information to and receive data information from one of the devices external from the node; and wherein the local switch comprises a plurality of transceiver duplicators, one corresponding to each of the transceivers, that receive and replicate signals output from the respective transceiver, a plurality of other local switch duplicators, one corresponding to each of the other local switches, that receive and replicate signals output from the respective other local switch; a plurality of transceiver selectors, one corresponding to each of the transceivers, that receive one of the replicated signals from at least one of the transceiver duplicators and one of the replicated signals from each of the other local switch duplicators, and select which, if any, of the received signals to output to the respective transceiver; and a plurality of other local switch selectors, one corresponding to each of the other local switches, that receive one of the replicated signals from each of the transceiver duplicators and select which, if any, of the received signals to output to the respective other local switch.

4. An apparatus according to claim 3, wherein the number of other local switch duplicators and selectors is greater than the number of the other local switches with the surplus number of other local switch duplicators and selectors not being utilized; and wherein the other local switch duplicators and selectors that are not utilized are arranged to be coupled to an additional other local switch that is within an additional apparatus that is added to the communication node.

5. A communication node arranged to be implemented within a communication system and comprising a plurality of apparatuses;

wherein each of the apparatuses comprise at least one communication device that is operable to transmit data information to or receive data information from a device external from the node; and a local switch coupled to the communication device; and wherein the local switches within the apparatuses are coupled together and each of the local switches is operable to selectively couple the respective communication device and at least one of the other local switches;

wherein at least one of the apparatuses comprises a first apparatus comprising first arid second communication devices, each of the first and second communication devices being operable to at least one of transmit data information to and receive data information from respective first and second devices external from the node; and wherein the local switch within the first apparatus is coupled to each of the first and second communication devices and is operable to selectively couple each of the first and second communication devices and at least one of the other local switches; and wherein the first communication device is a short-range optical fiber transceiver and the second communication device is a Dense Wavelength Division Multiplexed (DWDM) transceiver.

6. A communication node arranged to be implemented within a communication system and comprising, a plurality of apparatuses;

wherein each of the apparatuses comprise at least one communication device that is operable to transmit data information to or receive data information from a device external from the node, and a local switch coupled to the communication device; and wherein the local switches within the apparatuses are coupled together and each of the local switches is operable to selectively couple the respective communication device and at least one of the other local switches;

wherein at least one of the apparatuses comprises a first apparatus comprising first and second communication devices, each of the first and second communication devices being operable to at least one of transmit data information to and receive data information from respective first and second devices external from the node; and wherein the local switch within the first apparatus is coupled to each of the first and second communication devices and is operable to selectively couple each of the first and second communication devices and at least one of the other local switches; and wherein the first communication device comprises a receiver and multiplexer device and the second communication device comprises a demultiplexer and transmitter device.

7. A communication node arranged to be implemented within a communication system and comprising first and second circuit cards;

wherein the first circuit card comprises first and second communication devices that are each operable to both transmit data information to and receive data information from respective first and second devices external from the node; and a fir local switch coupled to the first and second communication devices;

wherein the second circuit card comprises third and fourth communication devices that are each operable to both transmit data information to and receive data information from respective third and fourth devices external from the node; and a second local switch coupled to the third and fourth communication devices;

wherein the first and second local switches are coupled together, the first local switch is operable to selectively couple each of the first and second communication devices and the second local switch, and the second local switch is operable to selectively couple the third and fourth communication devices and the first local switch; and wherein the communication node comprises a communication shelf, and each of the circuit cards are implemented within the communication shelf.

8. A communication node arranged to be implemented within a communication system and comprising on-ramp and off-ramp portions;

wherein the on-ramp portion comprises a plurality of on-ramp apparatuses that each comprise a short range receiver operable to receive data information from a short range location; a long range transmitter operable to transmit data information to a long range location; and a local switch coupled to the short range receiver and the long range transmitter;

wherein the off-ramp portion comprises a plurality of off-ramp apparatuses that each further comprise a long range receiver operable to receive data information from a long range location; a short range transmitter operable to transmit data information to a short range location; and a local switch coupled to the long range receiver and the short range transmitter; and wherein the local switches within the on-ramp apparatuses are coupled together and the local switches within the off-ramp apparatuses are coupled together; the local switches in the on-ramp apparatuses being operable to selectively couple the respective short range receiver and long range transmitter to each other and to the other local switches within the on-ramp apparatuses; and the local switches in the off-ramp apparatuses being operable lo selectively couple the respective long range receiver and short range transmitter to each other and to the other local switches within the off-ramp apparatuses, further comprising first and second separate switches;

wherein the plurality of on-ramp apparatuses comprise first, second, third, and fourth on-ramp apparatuses and the plurality of off-ramp apparatuses comprise first, second, third and fourth off-ramp apparatuses;

wherein the first and second on-ramp apparatuses have their short range receivers operable to receive data information from fist and second short range locations respectively and their long range transmitters operable to transmit data information to first and second long range locations respectively; the third and fourth on-ramp apparatuses have their short range receivers operable to receive data information from the second and first separate switches respectively and their long range transmitters operable to transmit data information to the first and second long range locations respectively;

wherein the first and second off-ramp apparatuses have their long range receivers operable to receive data information from the first and second long range locations respectively and their short range transmitters operable to transmit data information to the first and second short range locations respectively; the third and fourth off-ramp apparatuses have their long range receivers operable to receive data information from the first and second long range locations respectively and their short range transmitters operable to transmit data information to the first and second separate switches respectively; and wherein the first separate switch is operable to selectively receive data information from the second short range location and the short range transmitter within the third off-ramp apparatus and to selectively forward this data information to the first short range location and the short range receiver within the fourth on-ramp apparatus; and the second separate switch is operable to selectively receive data information from the first short range location and the short range transmitter within the fourth off-ramp apparatus and to selectively forward this data information to the second short range location and the short range receiver within the third on-ramp apparatus.

9. A communication node according to claim 8, wherein the first and second separate switches are optical switches.

10. A Bi-directional Line Switched Ring incorporating a plurality of communication nodes arranged to be implemented within a communication system and comprising a plurality of apparatuses;

wherein each of the apparatuses comprise at least one communication device that is operable to transmit data information to or receive data information from a device external from the node; and a local switch coupled to the communication device; and wherein the local switches within the apparatuses are coupled together and each of the local switches is operable to selectively couple the respective communication device and at least one of the other local switches;

wherein the communication devices comprised within the apparatuses of each of the communication nodes comprise at least two Wavelength Division Multiplexed (WDM) transmitters and receivers, one for each direction within the BLSR.

11. A BLSR according to claim 10, wherein the WDM transmitters and receivers are combined into WDM transceivers.

* * * * *

UNITED STATES PATENT AND TRADEMARK OFFICE
CERTIFICATE OF CORRECTION

PATENT NO.    : 6,744,760 B1
DATED         : June 1, 2004
INVENTOR(S)   : Alan Solheim It is certified that error appears in the above-identified patent and that said Letters Patent is hereby corrected as shown below:

Column 11,
Line 4, "...intonation..." should read -- ...-information... --.
Line 19, "...lo..." should read -- ...to... --.
Line 20, "...switch that..." should read -- ...switch, that... --.
Line 56, "...transceiver, a..." should read -- ...tranceiver; a... --.

Column 12,
Line 45, "...comprising, a..." should read -- ...comprising a ... --.

Column 13,
Line 14, "...fir..." should read -- ...first... --.
Line 57, "...lo..." should read -- ...to... --.

Column 14,
Line 2, "...third and..." should read -- ...third, and ... --.
Line 5, "...fist..." should read -- ...first... --.

Signed and Sealed this

Sixth Day of September, 2005

JON W. DUDAS
*Director of the United States Patent and Trademark Office*